(12) United States Patent
Park et al.

(10) Patent No.: US 10,389,466 B2
(45) Date of Patent: Aug. 20, 2019

(54) METHOD AND DEVICE FOR MITIGATING INTER-CELL INTERFERENCE

(71) Applicant: LG ELECTRONICS INC., Seoul (KR)

(72) Inventors: Kungmin Park, Seoul (KR); Heejeong Cho, Seoul (KR); Hyunsoo Ko, Seoul (KR); Hyeyoung Choi, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 15/511,221

(22) PCT Filed: Sep. 22, 2014

(86) PCT No.: PCT/KR2014/008761
§ 371 (c)(1),
(2) Date: Mar. 14, 2017

(87) PCT Pub. No.: WO2016/047813
PCT Pub. Date: Mar. 31, 2016

(65) Prior Publication Data
US 2017/0310414 A1    Oct. 26, 2017

(51) Int. Cl.
*H04J 11/00* (2006.01)
*H04L 5/00* (2006.01)
(Continued)

(52) U.S. Cl.
CPC ............ *H04J 11/005* (2013.01); *H04B 7/024* (2013.01); *H04B 7/046* (2013.01); *H04B 7/0669* (2013.01);
(Continued)

(58) Field of Classification Search
CPC .. H04J 11/005; H04J 11/0023; H04J 11/0026; H04J 11/003; H04L 5/0007;
(Continued)

(56) References Cited

U.S. PATENT DOCUMENTS

| 8,208,574 | B2 * | 6/2012 | Haghighat | ............ | H04L 1/0606 |
| | | | | | 370/343 |
| 2011/0069780 | A1 * | 3/2011 | Novak | ................. | H04B 7/0667 |
| | | | | | 375/295 |

FOREIGN PATENT DOCUMENTS

| KR | 10-2010-0023529 | 3/2010 |
| KR | 10-2013-0044363 | 5/2013 |

OTHER PUBLICATIONS

Osseiran, et al., "Interference Mitigation for MIMO Systems Employing User-specific, Linear Precoding", PIMRC 2008, IEEE 19th International Symposium, Sep. 2008, 7 pages.
(Continued)

*Primary Examiner* — Betsy Deppe
(74) *Attorney, Agent, or Firm* — Lee Hong Degerman Kang Waimey

(57) ABSTRACT

The present invention provides a method for mitigating inter-cell interference. To this end, the present invention includes a second signal transmission step in which, when a transmission symbol to be transmitted to a first receiver is S and a transmission symbol to be transmitted to a second receiver is Z, a symbol $S_{2k}$ (k is an integer) is transmitted to the first receiver through a first transmission antenna according to a first pattern, a symbol $S_{2k}^*$ is transmitted to the first receiver through a second transmission antenna, a symbol $S_{2k+1}$ is transmitted to the first receiver through a third transmission antenna, a symbol $S_{2k+1}^*$ is transmitted to the first receiver through a fourth transmission antenna, and symbols $Z_{4k}$ to $Z_{4k+3}$ and symbols $Z_{4k}^*$ to $Z_{4k+3}^*$ are
(Continued)

transmitted to the second receiver through fifth to eighth transmission antennas according to a second pattern different from the first pattern.

4 Claims, 19 Drawing Sheets

(51) Int. Cl.
    *H04B 7/024*     (2017.01)
    *H04B 7/06*     (2006.01)
    *H04L 27/26*     (2006.01)
    *H04B 7/0456*     (2017.01)
    *H04W 88/08*     (2009.01)

(52) U.S. Cl.
    CPC .......... *H04L 5/0007* (2013.01); *H04L 5/0023* (2013.01); *H04L 5/0037* (2013.01); *H04L 5/0073* (2013.01); *H04L 27/2626* (2013.01); *H04W 88/08* (2013.01)

(58) Field of Classification Search
    CPC . H04L 27/2626; H04L 5/0023; H04L 1/0606; H04L 1/0618; H04B 7/06; H04B 7/066; H04B 7/068; H04B 7/024; H04B 7/026; H04B 7/0667; H04B 7/0452; H04B 7/0669
    See application file for complete search history.

(56) References Cited

OTHER PUBLICATIONS

Lee, et al., "Interference-aware Precoding Schemes for Multicell MIMO/TDD Systems", GLOBECOM 2008. IEEE, Dec. 2008, 5 pages.

Lee, et al., "Design on the Interference Alignment Transceiver for Multi-Cell MIMO Downlink Channels", vol. 37B No. 10, Oct. 2012, 9 pages.

PCT International Application No. PCT/KR2014/008761, Written Opinion of the International Searching Authority dated May 20, 2015, 4 pages.

* cited by examiner

FIG. 7

Period 6, offset 1

| $Z_0$ | $-Z_1^*$ |         |         |       |          |
|-------|----------|---------|---------|-------|----------|
| $Z_1$ | $Z_0^*$  | $Z_2$   | $-Z_3^*$|       |          |
|       |          | $Z_3$   | $Z_2^*$ | $Z_4$ | $-Z_5^*$ |
|       |          |         |         | $Z_5$ | $Z_4^*$  |

FIG. 8

Period 4, offset 1

| $Z_0$ | $-Z_1^*$ |       |         |
|-------|----------|-------|---------|
|       |          | $Z_2$ | $-Z_3^*$ |
| $Z_1$ | $Z_0^*$  |       |         |
|       |          | $Z_3$ | $Z_2^*$ |

FIG. 9

Period 8, offset 1, shift 1

| $Z_0$ | $-Z_1^*$ |       |          |       |          | $Z_3$ | $Z_2^*$  |
|-------|----------|-------|----------|-------|----------|-------|----------|
| $Z_1$ | $Z_0^*$  | $Z_2$ | $-Z_3^*$ |       |          |       |          |
|       |          | $Z_3$ | $Z_2^*$  | $Z_4$ | $-Z_5^*$ |       |          |
|       |          |       |          | $Z_5$ | $Z_4^*$  | $Z_2$ | $-Z_3^*$ |

FIG. 12A

|     |         |         |       |         |
|-----|---------|---------|-------|---------|
| $A_0$ | $Z_0$ |         |       |         |
| $A_1$ |       | $Z_0^*$ |       |         |
| $A_2$ |       |         | $Z_1$ |         |
| $A_3$ |       |         |       | $Z_1^*$ |

FIG. 12B

Period 4, offset 1 Cyclic shift

| | | | | | | | |
|---|---|---|---|---|---|---|---|
| $A_0$ | $Z_0$ | | | | | | $Z_3^*$ |
| $A_1$ | | $Z_0^*$ | | | $Z_2$ | | |
| $A_2$ | | | | $Z_1$ | | $Z_2^*$ | |
| $A_3$ | | | | | $Z_1^*$ | | $Z_3$ |

FIG. 12C

Period 4, offset 3 Cyclic shift

| | | | | | | | |
|---|---|---|---|---|---|---|---|
| $A_0$ | $Z_0$ | | | | | $Z_2^*$ | |
| $A_1$ | | $Z_0^*$ | | | | | $Z_3$ |
| $A_2$ | | | $Z_1$ | | | | $Z_3^*$ |
| $A_3$ | | | | $Z_1^*$ | $Z_2$ | | |

METHOD AND DEVICE FOR MITIGATING INTER-CELL INTERFERENCE

CROSS-REFERENCE TO RELATED APPLICATIONS

This application is the National Stage filing under 35 U.S.C. 371 of International Application No. PCT/KR2014/008761, filed on Sep. 22, 2014, the contents of which are all hereby incorporated by reference herein in its entirety.

BACKGROUND OF THE INVENTION

Field of the Invention

The present invention relates to wireless communications, and more particularly, to a method and apparatus for mitigating inter-cell interference.

Related Art

According to the transmission technique based on the orthogonal frequency division multiplexing access (OFDMA), one or more subcarriers may be independently allocated to each terminal. Accordingly, following a request of a terminal, a frequency resource may be efficiently allocated without the frequency interference within a cell.

In a cellular network system, depending on the position of a terminal in a cell, the performance of the system may be significantly changed. Particularly, the inter-cell interference may significantly degrade the performance of the terminal located on a cell boundary. In addition, as the efficiency of the frequency reuse, high data transmission rate may be obtained in the center of a cell, but the inter-cell interference gets worse. Accordingly, on the cell boundary, a terminal may undergoes great interference from a neighboring cell, and accordingly, the degradation of the signal to interference plus noise ratio (SINR) of the terminal may become more serious.

In the cellular network system based on the OFDMA, in order to mitigate the inter-cell interference, a research have been performed of a technique for avoiding the inter-cell interference, that of a technique of averaging the influence of the inter-cell interference, that of a technique for removing the inter-cell interference, and the like.

Currently, in a cellular network system, many moving cells are existed. The inter-cell interference may occur between a moving cell and a fixed cell. Accordingly, a method for mitigating the inter-cell interference between a moving cell and a fixed cell is required.

SUMMARY OF THE INVENTION

According to an embodiment of the present invention, a method and apparatus for mitigating inter-cell interference is provided.

Another object of the present invention is to provide a precoding method for mitigating inter-cell interference and an apparatus using the same.

In an aspect of a method for mitigating inter-cell interference may include, when a transmission symbol which is going to transmitted to a first receiver is S and a transmission symbol which is going to transmitted to a second receiver is Z, transmitting a first signal including transmitting symbol $S_{2k}$ (k is an integer) to the first receiver through a first transmission antenna according to a first pattern, transmitting symbol $S_{2k}$* to the first receiver through a second transmission antenna, transmitting symbol $S_{2k+1}$ to the first receiver through a third transmission antenna, and transmitting symbol $S_{2k+1}$* to the first receiver through a fourth transmission antenna, and transmitting a second signal including transmitting symbols $Z_{4k}$ to $Z_{4k+3}$ and symbols $Z_{4k}$* to $Z_{4k+3}$* to the second receiver through a fifth transmission antenna to an eighth transmission antenna according to a second pattern which is different from the first pattern.

The sequence may be allocated to a frequency resource, or allocated to a time resource.

The first pattern and the second pattern may be changed according to a predetermined period.

Advantageous Effects

According to the present invention, a method and apparatus for mitigating inter-cell interference is provided.

According to the present invention, the inter-cell interference between moving cells of which channel states are rapidly changed based on the precoding at a transmitting end. Particularly, without performing a separate equalization for the interference at a receiving end, the interference signal included in a reception signal at a receiving end may be faded out by averaging the interference signal based on the precoding at a transmitting end.

According to an embodiment of the present invention, a precoding method for mitigating inter-cell interference and an apparatus using the same are provided.

BRIEF DESCRIPTION OF THE DRAWINGS

FIG. 7 is a diagram illustrating a symbol pattern according to still another embodiment of the present invention.

FIG. 8 is a diagram illustrating a symbol pattern according to still another embodiment of the present invention.

FIG. 9 is a diagram illustrating a symbol pattern according to still another embodiment of the present invention.

FIG. 12a is a diagram illustrating other symbol pattern according to another embodiment of the present invention.

FIG. 12b is a diagram illustrating other symbol pattern according to another embodiment of the present invention.

FIG. 12c is a diagram illustrating other symbol pattern according to another embodiment of the present invention.

DESCRIPTION OF EXEMPLARY EMBODIMENTS

A wireless device may be stationary or mobile, and may be called as other terms such as a user equipment (UE), a user terminal (UT), a subscriber station (SS), mobile terminal (MT), and so on. In addition, the wireless device may be a mobile device equipped with a communication function such as a mobile phone, a PDA, a Smart phone, a wireless modem, a notebook PC, and so on, or a non-mobile device such as a PC, a vehicle mounted device. A base station generally refers to a fixed station that communicates with a wireless device and may be called as other terms such as an evolved-NodeB (eNB), a base transceiver system (BTS), an access point, and the like.

Hereinafter, it will be described that the present invention is applied based on 3rd Generation Partnership Project (3GPP) long term evolution (LTE) or 3GPP LTE-Advanced (LTE-A). However, this is just an example, and the present invention may be applied to various wireless communication systems. Hereinafter, the term LTE includes LTE and/or LTE-A.

The present disclosure describes a communication network as a target. And, the tasks in the communication network may be performed during a procedure of controlling a network and transmitting data in the system (e.g., a base station) that manages the corresponding communication network, or may be performed in a wireless device linked to the corresponding network.

Figure 1:
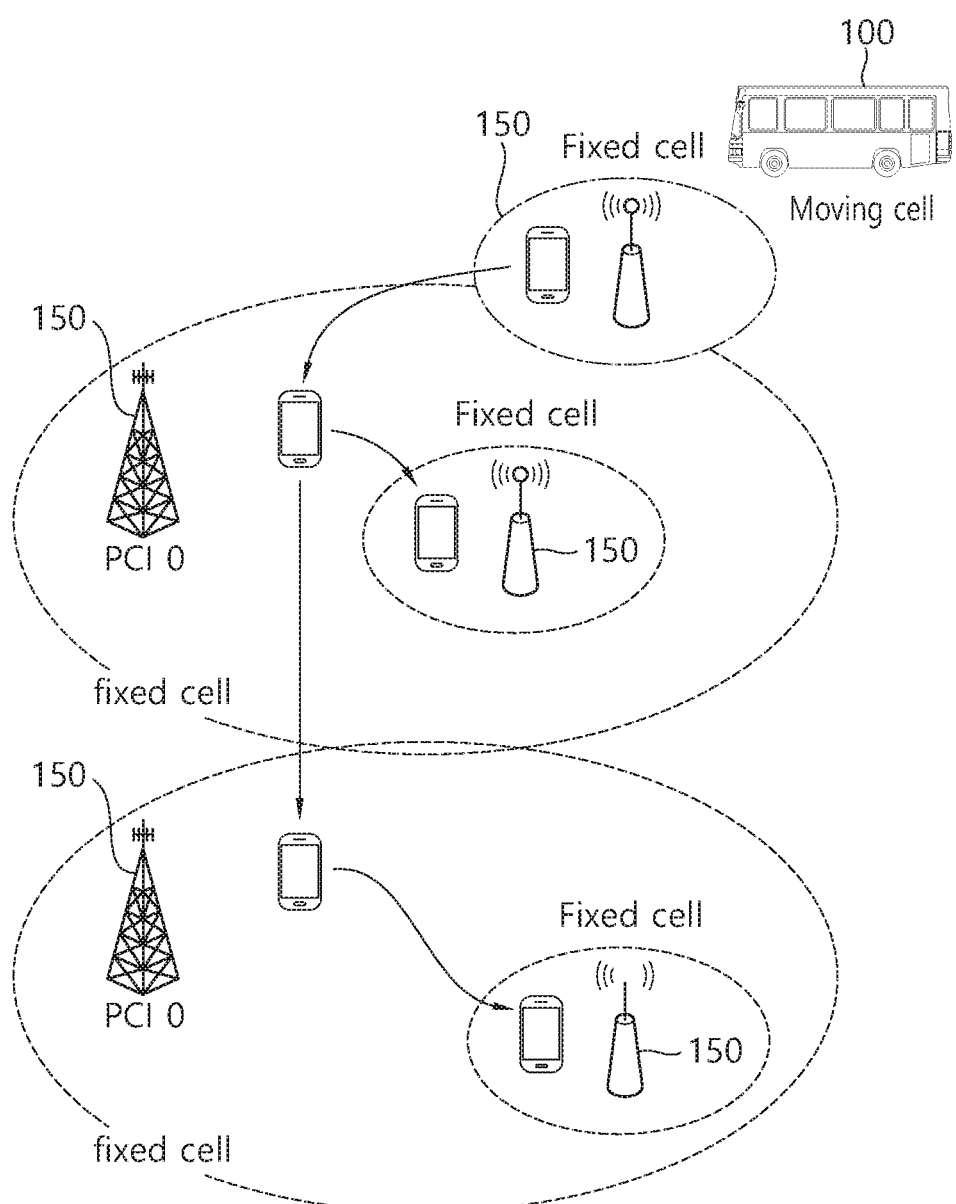
FIG. 1 is a conceptual diagram illustrating a movement in a moving cell.

FIG. 1 is a conceptual diagram illustrating a movement in a moving cell.

Hereinafter, in an embodiment of the present invention, a moving cell may indicate a mobile base station, and a fixed cell may indicate a base station that does not moves in a fixed position. A moving cell may be expressed as other term, a moving base station, and a fixed cell may be expressed as other term, a fixed base station.

For example, a moving cell 100 may be a base station installed in a mobile object such as a bus. Based on the buses in Seoul, about 2000 moving cells 100 may be existed. Accordingly, in the current cellular network system, there is high possibility that the interference occurs between the moving cell 100 and a fixed cell 150.

In the case of the inter-cell interference (ICI) between the fixed cells 150, in order to mitigate the inter-cell interference, the resource division may be performed considering the distance between a base station and a wireless device. Or, the interference may be mitigated by performing a dynamic resource division by sharing the channel information between cells or by performing a cooperative communication.

However, in the case of the moving cell 100, there is a difficulty in using the interference control method between the fixed cells 150 as it is.

Figure 2:
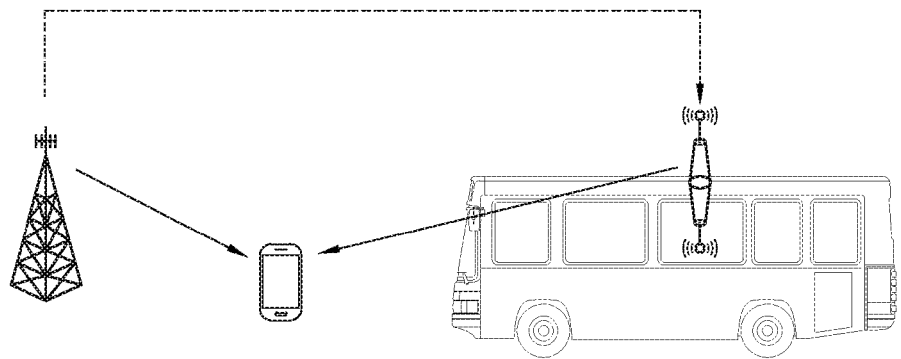
FIG. 2 is a conceptual diagram illustrating the problem that may occur in the case that the interference between a moving cell and a fixed cell is controlled by the existing inter-cell interference control technique.
Figure 2:
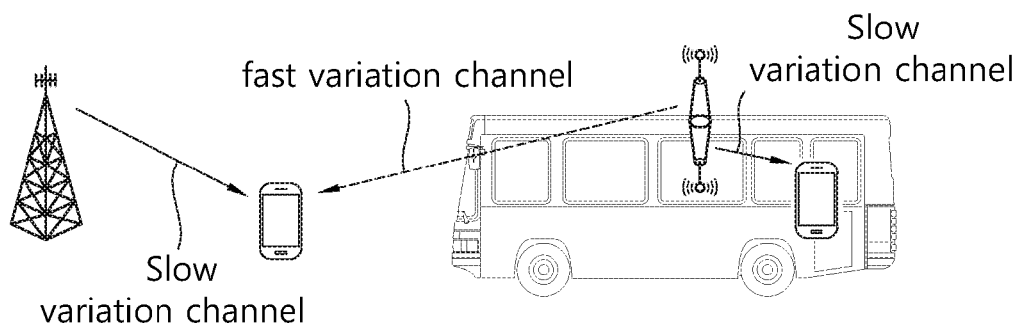

FIG. 2 is a conceptual diagram illustrating the problem that may occur in the case that the interference between a moving cell and a fixed cell is controlled by the existing inter-cell interference control technique.

There are many cases that a service is provided through a real-time traffic in the moving cell. Accordingly, the interference control based on the semi-static resource division may be improper in the moving cell.

Referring to the upper part of FIG. 2, a moving cell may be connected with another cell based on the wireless backhaul. Accordingly, it may be difficult to perform the dynamic resource division by sharing channel information or use the inter-cell interference mitigation method based on the cooperative communication. Particularly, in the case of the joint transmission (JT)/dynamic point selection (DPS), the data that is going to be transmitted to a wireless device should be shared through a wired backhaul between base stations. However, the data sharing between the moving cell through the wired backhaul and the fixed cell requires an additional use of the wireless resource, but also makes it difficult to share the data stably depending on a wireless channel situation. Accordingly, the interference mitigation between a fixed cell and a moving cell based on the cooperative communication may be difficult.

Referring to the lower part of FIG. 2, the channel between a moving cell and a fixed cell may be rapidly changed owing to the movement of the moving cell. Accordingly, the interference mitigation through the closed loop multiple input multiple output (MIMO) may be difficult. Accordingly, the development of a technique is required to control and decrease the interference in the situation that the sharing of information on the signal between cells and the interference channel is not secured. Particularly, the open loop interference mitigation is required to mitigate the interference on a moving cell.

According to an embodiment of the present invention, based on an inter-cell interference randomizing and an inter-cell interference averaging, the inter-cell interference, particularly, the interference between a moving cell and a fixed cell may be mitigated.

The inter-cell interference randomizing is a method of randomizing the interference from a neighboring cell and approximating it using the additive white Gaussian noise (AWGN). The inter-cell interference randomizing may decrease the influence of the process of decoding channel by the signal of other user based on, for example, the cell-specific scrambling, the cell-specific interleaving, and so on.

The an inter-cell interference averaging is a method of averaging the inter-cell interference in the level of channel coding block through averaging all of the interferences due to a neighboring cell or symbol hopping.

In addition, according to an embodiment of the present invention, a method of securing the interference diversity in a semi-static channel duration in order to diversify the interference signal that influences on de-precoding of each symbol, to change the signal to interference rate (SIR) of the signal in a Quasi-static channel duration, and to obtain the diversity gain is provided.

Generally, the signal diversity means averaging the receiving power of a signal by repeatedly transmitting and receiving the identical information through various channels. According to the signal diversity, the signal to interference plus noise rate (SINR) is variably decreased, and owing to it, the possibility of recovering the information in a padding channel may be increased.

The interference diversity according to the present invention is the similar concept as the signal diversity. According to the interference diversity, by receiving a plurality of interferences through various channels, the receiving power of the interference becomes equalized and the SINR variation due to the interference may be decreased. Through this, an effect of increasing the diversity gain of the signal is generated in the situation that the receiving power of the interference signal is great.

Figure 3:
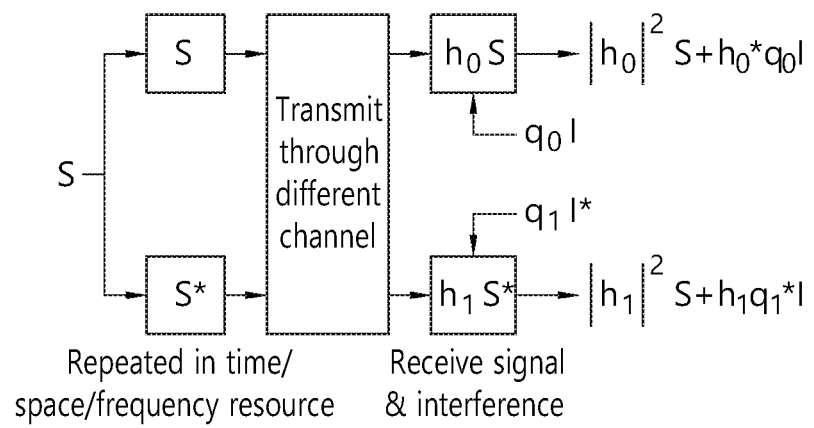
FIG. 3 is a diagram illustrating a situation that a signal is repeatedly transmitted through different channels.

FIG. 3 is a diagram illustrating a situation that a signal is repeatedly transmitted through different channels.

As shown in the drawing, a transmitting end may transmit a single transmission symbol (S, hereinafter, a first symbol) and a modified symbol (S*, hereinafter, a second symbol) to a receiving end such as a wireless device through different channels with each other, for example, different antennas. In this case, the second symbol represents that the complex conjugate operation is performed with respect to the first symbol.

Herein, $h_0$ represents a channel for the symbol between an antenna transmitting the first symbol and a receiving end, and $h_1$ represents a channel for the symbol between an antenna transmitting the second symbol and a receiving end.

In this case, I represents an interference signal, I* represents an interference signal which is operated by the complex conjugate. $q_0$ represents a channel for the interference signal between an antenna transmitting the first symbol and a receiving end, and $q_1$ represents a channel for the interference signal between an antenna transmitting the second symbol and a receiving end.

The first symbol and the second symbol may be repeatedly transmitted by being allocated to time, space or frequency resource, and a receiving end may receive the signal and the interference.

As shown in the drawing, when the first symbol is transmitted, the receiving end may receive $|h_0|^2 S + h_0^* q_0 I$ together with the interference signal, and the receiving end may receive $|h_1|^2 S + h_1 q_1^* I$ with respect to the second symbol.

Finally, the symbol and the interference signal received by the receiving end may be represented as Equation 1.

$$\frac{|h_0|^2 + |h_1|^2}{2} S + \frac{(h_0^* q_0 + h_1 q_1^*) I}{2} \quad \text{[Equation 1]}$$

In the case that the channel state is the semi-static state in which the channel is hardly changed, the interference diversity effect is decreased.

Figure 4:
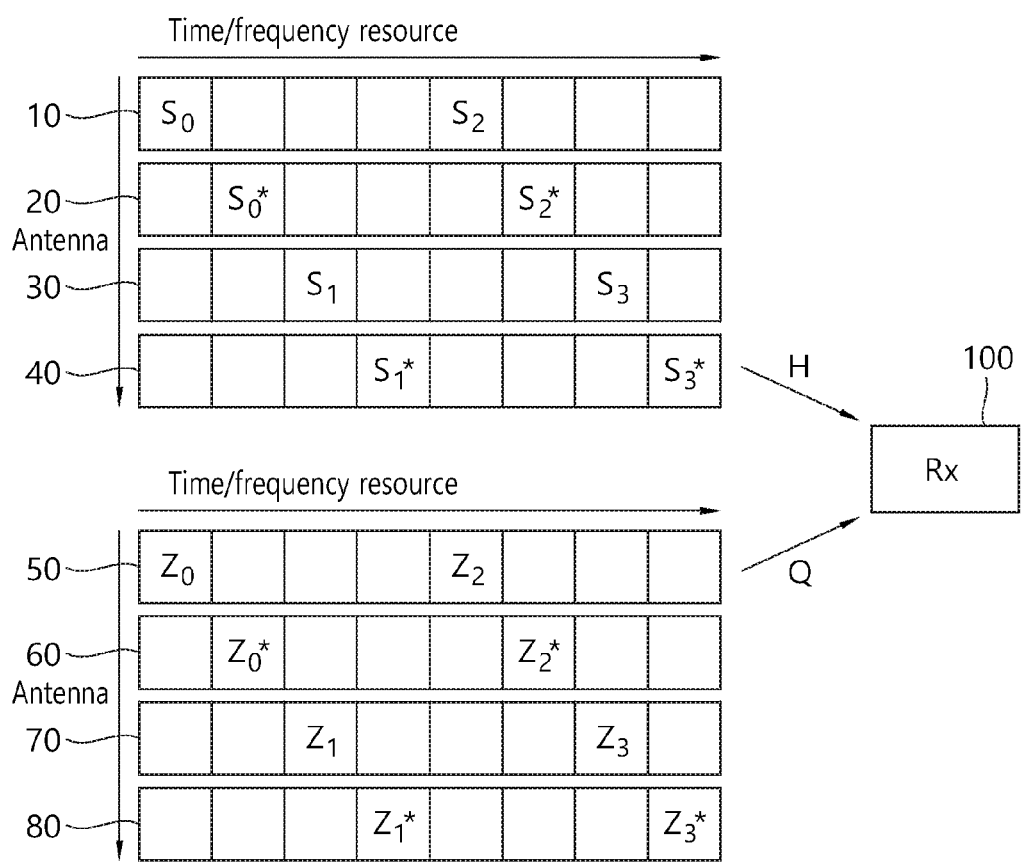
FIG. 4 is a diagram illustrating a symbol and an interference signal received through a semi-static channel.

FIG. 4 is a diagram illustrating a symbol and an interference signal received through a semi-static channel.

As shown in FIG. 4, a wireless device 100, which is a receiving end Rx, may receive symbol S transmitted through four antennas, and may receive the signal transmitted through four antennas as an interference signal Z.

A first antenna 10, a second antenna 20, a third antenna 30 and a fourth antenna 40 may be antennas of a cell (hereinafter, a first cell) that provides a service to the wireless device 100, and a fifth antenna 50, a sixth antenna 60, a seventh antenna 70 and an eighth antenna 80 may be antennas of a cell (hereinafter, a second cell) that transmits a symbol Z that may act as an interference signal to the wireless device 100.

For example, in the case that a fixed cell acts as an interference source with respect to the wireless device serviced by a moving cell, the first cell may be the moving cell and the second cell may be the fixed cell. On the contrary, in the case that a moving cell is an interference source with respect to the wireless device serviced by a fixed cell, the first cell may be the fixed call and the second cell may be the moving cell.

In FIG. 4, the row for the symbol may mean the resource on which the symbol such as time, space or frequency is transmitted.

In the semi-static state in which a channel is not changed for a predetermined duration, symbols $S_0$ and $S_2$ are transmitted through the first antenna 10, and the symbols $S_0^*$ and $S_2^*$ which are a modification or complex conjugate of the symbols transmitted through the first antenna 10 are transmitted through the second antenna 20. In addition, symbols $S_1$ and $S_3$ are transmitted through the third antenna 30, and the symbols $S_1^*$ and $S_3^*$ which are a modification or complex conjugate of the symbols transmitted through the third antenna 30 are transmitted through the fourth antenna 40.

Symbols $Z_0$ and $Z_2$ are transmitted through the fifth antenna 50, and the symbols $Z_0^*$ and $Z_2^*$ which are a modification or complex conjugate of the symbols transmitted through the fifth antenna 50 are transmitted through the sixth antenna 60. In addition, symbols $Z_1$ and $Z_3$ are transmitted through the seventh antenna 70, and the symbols $Z_1^*$ and $Z_3^*$ which are a modification or complex conjugate of the symbols transmitted through the seventh antenna 70 are transmitted through the eighth antenna 80.

In the aspect of the wireless device, the transmission symbol S transmitted in the first cell may be a reception signal and the transmission symbol Z transmitted in the second cell may be an interference signal.

Accordingly, in FIG. 4, H represents the channel between the first cell and the wireless device 100 serviced by the first cell, and Q represents the channel between the second cell and the wireless device.

In the case that $S_0$ and $S_2$ are received through the same channel as $Z_0$ and $Z_2$, for example, in the case that frequency is flat with respect to a channel, the reception symbol $\hat{S}_0$, $\hat{S}_1$, $\hat{S}_2$, $\hat{S}_3$ that the wireless device receives finally may be represented by Equation 2.

$$\hat{S}_0 = S_0 + \frac{(h_0^* q_0 + h_1 q_1^*) Z_0}{|h_0|^2 + |h_1|^2} \quad \text{[Equation 2]}$$

$$\hat{S}_1 = S_1 + \frac{(h_2^* q_2 + h_3 q_3^*) Z_1}{|h_2|^2 + |h_3|^2}$$

$$\hat{S}_2 = S_2 + \frac{(h_0^* q_0 + h_1 q_1^*) Z_2}{|h_0|^2 + |h_1|^2}$$

$$\hat{S}_3 = S_3 + \frac{(h_2^* q_2 + h_3 q_3^*) Z_3}{|h_2|^2 + |h_3|^2}$$

As represented in Equation 2, since the coefficient $$\frac{(h_0^* q_0 + h_1 q_1^*)}{|h_0|^2 + |h_1|^2}$$

of the interference signal that acts on the reception symbol is the same for two symbols $\hat{S}_0$, $\hat{S}_2$, and is the same in two symbols $\hat{S}_1$, $\hat{S}_3$ as $$\frac{(h_2^* q_2 + h_3 q_3^*)}{|h_2|^2 + |h_3|^2},$$

it may be identified that the SIR for two symbols are the same.

In Equation 2, $h_0$ represents the channel for the symbol between the antenna transmitting symbol $S_0$ and a receiving end, and $h_1$ represents the channel for the symbol between the antenna transmitting symbol $S_1$ and a receiving end. And, $h_2$ represents the channel for the symbol between the antenna transmitting symbol $S_2$ and a receiving end, and $h_3$ represents the channel for the symbol between the antenna transmitting symbol $S_3$ and a receiving end.

In this case, $q_0$ represents the channel for the interference signal between the antenna transmitting symbol $Z_0$ and a receiving end, and $q_1$ represents the channel for the interference signal between the antenna transmitting symbol $Z_1$ and a receiving end. And, $q_2$ represents the channel for the interference signal between the antenna transmitting symbol $Z_2$ and a receiving end, and $q_3$ represents the channel for the interference signal between the antenna transmitting symbol $Z_3$ and a receiving end. $q_0$ to $q_3$ are regarded as the interference channels with respect to the wireless device.

This may represent that the gain for the diversity of the entire packet is limited or decreased. In the case that the interference is great in the semi-static state, the situation in which a wireless device undergoes strong interference may be continued. That is, in a situation of limited interference, the diversity gain may be decreased.

Hereinafter, a method for securing the interference diversity by changing a repetition pattern of an interference symbol, not the interference of the same size, will be described.

Figure 5:
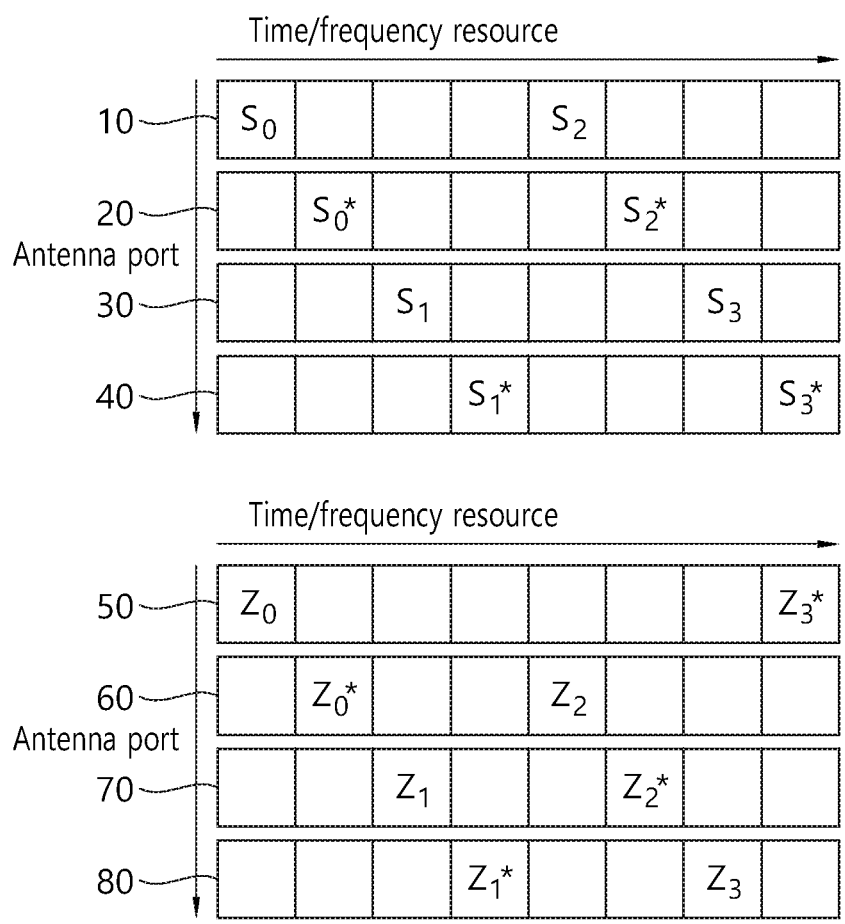
FIG. 5 is a diagram illustrating a repetition pattern of a reception symbol according to an embodiment of the present invention.

FIG. 5 is a diagram illustrating a repetition pattern of a reception symbol according to an embodiment of the present invention.

As shown in FIG. 5, in the semi-static state in which a channel is not changed for a predetermined duration, symbols $S_0$ and $S_2$ are transmitted through the first antenna 10, and the symbols $S_0^*$ and $S_2^*$ which are a modification or complex conjugate of the symbols transmitted through the first antenna 10 are transmitted through the second antenna 20. In addition, symbols $S_1$ and $S_3$ are transmitted through the third antenna 30, and the symbols $S_1^*$ and $S_3^*$ which are a modification or complex conjugate of the symbols transmitted through the third antenna 30 are transmitted through the fourth antenna 40. Symbols $S_0$, $S_1$, $S_2$ and $S_3$ are transmitted through the first antenna 10 or the third antenna 30, and the symbols $S_0^*$, $S_1^*$, $S_2^*$ and $S_3^*$ which are a modification or complex conjugate of the symbols transmitted through the first antenna 10 or the third antenna 30 are transmitted through the second antenna 20 or the fourth antenna 40.

Symbol $Z_0$ may be transmitted through the fifth antenna 50, and the symbol $Z_0^*$ which is a modification or complex conjugate of the symbol $Z_0$ may be transmitted through the sixth antenna 60. And, symbol $Z_1$ may be transmitted through the seventh antenna 70, and the symbol $Z_1^*$ which is a modification or complex conjugate of the symbol $Z_1$ may be transmitted through the eighth antenna 80. Meanwhile, symbol $Z_3^*$ which is a modification or complex conjugate of the symbol $Z_3$ may be allocated to resource through the fifth antenna 50, and symbol $Z_2$ may be allocated to resource through the sixth antenna 60. And, symbol $Z_2^*$ which is a modification or complex conjugate of the symbol $Z_2$ may be allocated to resource through the seventh antenna 70, and symbol $Z_3$ may be allocated to resource through the eighth antenna 80, sequentially.

According to an embodiment of the present invention, even in the case that the first cell is not changed during transmitting symbols $S_0$ to $S_3$ (frequency flat), since the channel in which the interference is received is changed, the diversity of the interference may be increased.

The first cell and the second cell, which is transmitting ends, use different precoder with each other, and accordingly, such a change of the repetition pattern may be implemented.

As such, in the case that the pattern of the symbol being repeated is changed, the reception symbol $\hat{S}_0$, $\hat{S}_1$, $\hat{S}_2$, $\hat{S}_3$ received by the wireless device may be represented by Equation 3.

$$\hat{S}_0 = S_0 + \frac{(h_0^* q_0 + h_1 q_1^*) Z_0}{|h_0|^2 + |h_1|^2}$$ [Equation 3]

$$\hat{S}_2 = S_2 + \frac{(h_0^* q_1 + h_1 q_2^*) Z_2}{|h_0|^2 + |h_1|^2}$$

$$\hat{S}_1 = S_1 + \frac{(h_2^* q_2 + h_3 q_3^*) Z_1}{|h_2|^2 + |h_3|^2}$$

$$\hat{S}_3 = S_3 + \frac{(h_2^* q_3 + h_3 q_0^*) Z_3}{|h_2|^2 + |h_3|^2}$$

In the equation of acting as the interference in the reception symbol $\hat{S}_0$, $\hat{S}_1$, $\hat{S}_2$, $\hat{S}_3$, as represented in Equation 3, different interference symbols are included. That is, symbol $S_0$ may be received in the wireless device as interference through $q_0$ and $q_1$, and symbol $S_1$ may be received in the wireless device as interference through $q_2$ and $q_3$. And, symbol $S_2$ may be received in the wireless device as interference through $q_1$ and $q_2$, and symbol $S_3$ may be received in the wireless device as interference through $q_3$ and $q_0$.

This represents that the interference is changed for each symbol in the semi-static duration. Through this, it is available to secure the interference diversity for a packet, and the effect of improving diversity performance is generated.

Figure 6:
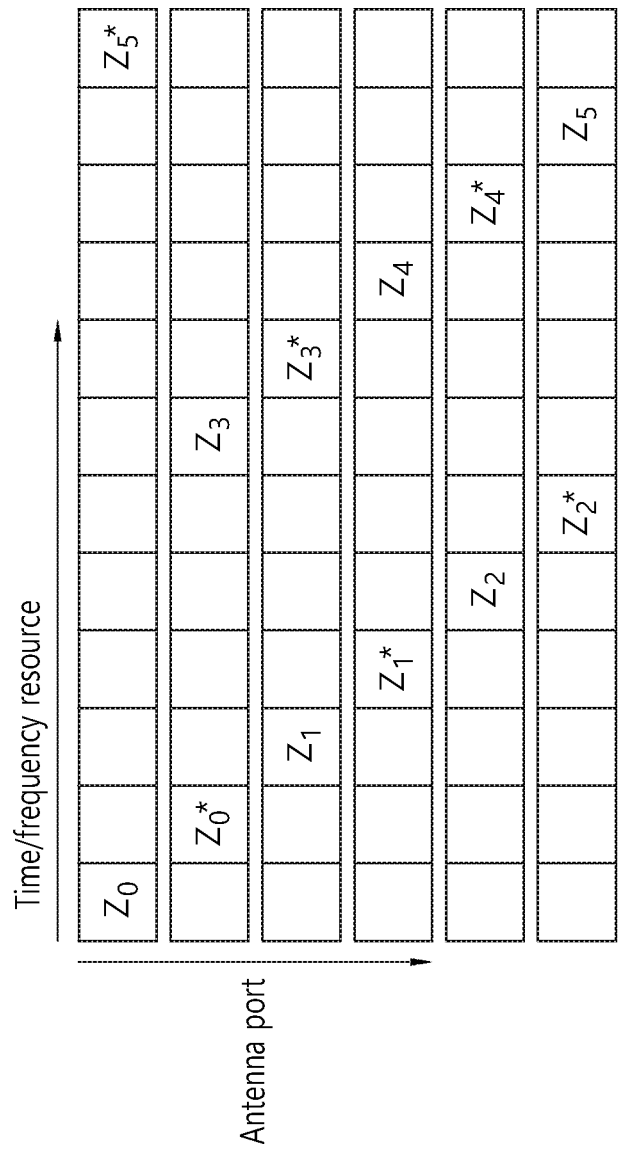
FIG. 6 is a diagram illustrating a symbol pattern according to another embodiment of the present invention.

FIG. 6 is a diagram illustrating a symbol pattern according to another embodiment of the present invention.

FIG. 6 may correspond to the space time block code (STBC) used in the second cell for the inter-cell interference randomizing and the inter-cell interference averaging.

The rows of the STBC shown in FIG. 6 may correspond to the antennas of the second cell, respectively, and the columns of the STBC may correspond to the transmission resources (time resource and frequency resource) of the second cell.

FIG. 6 shows the case that there are 6 antennas in a transmitting end (cell),
which may be similarly applied to the case that there are N antenna ports. In this case, the transmitting end of each cell may precode the symbol using different precoders.

As shown in FIG. 6, the first antenna to the sixth antenna of the second cell are allocated with symbols $Z_0$, $Z_0^*$, $Z_1$, $Z_1^*$, $Z_2$ and $Z_2^*$, sequentially.

For the symbols $Z_3$ to $Z_5$, the symbols $Z_5^*$, $Z_3$, $Z_3^*$, $Z_4$, $Z_4^*$ and $Z_5$, which are not the existing pattern $Z_3$, $Z_3^*$, $Z_4$, $Z_4^*$, $Z_5$ and $Z_5^*$, are allocated to the first antenna to the sixth antenna, respectively.

By changing the pattern of the repeated symbol, the interference diversity of the reception symbol may be increased.

Figure 8:
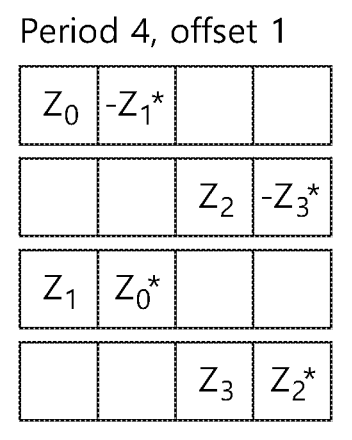

FIGS. 7 to 9 are diagrams illustrating other symbol patterns according to still another embodiment of the present invention.

FIGS. 7 to 9 show the symbol patterns that are applied to the full rank STBC or the space frequency block code (SFBC).

FIG. 7 shows the case that the repetition pattern period of a symbol is 6 and the offset is 1 in four antennas. That is, 6 symbols such as $Z_0$ to $Z_5$ and the modified symbol patterns therefor are shown in FIG. 7. Such symbol patterns will be repeated in the next 6 symbols.

FIG. 8 shows the case that the repetition pattern period of a symbol is 4 and the offset is 1 in four antennas. That is, 4 symbols such as $Z_0$ to $Z_3$ and the modified symbol patterns therefor are shown in FIG. 8. Such symbol patterns will be repeated in the next 4 symbols.

FIG. 9 shows the case that the repetition pattern period of a symbol is 8 and the offset is 1 in four antennas. Six symbols such as $Z_0$ to $Z_5$ and the modified symbol patterns therefor are shown in FIG. 9. In FIG. 9, symbols such as $Z_2$ and $Z_3$ and the modified symbol patterns therefor are repeated once more.

Figure 10:
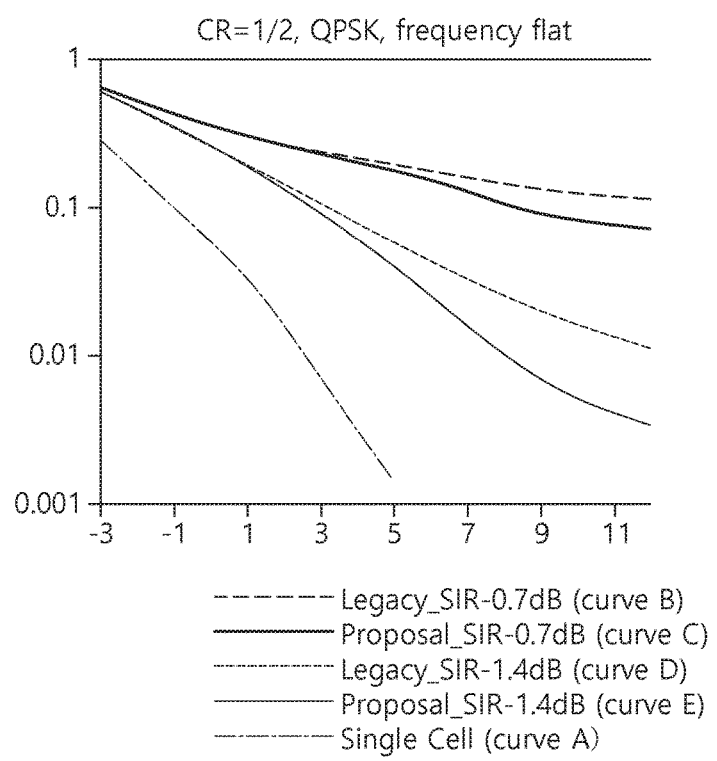
FIG. 10 is a graph illustrating the PER for the SNR in the case that the interference diversity is implemented according to an embodiment of the present invention.

FIG. 10 is a graph illustrating the PER for the SNR in the case that the interference diversity is implemented according to an embodiment of the present invention.

In FIG. 10, the PER represents a packet error rate, and on the assumption of the environment that a moving cell exerts interference on a small cell, a symbol is modulated using a convolution code that uses the QPSK. FIG. 10 shows the result that a simulation is performed in the situation that a coding rate is 1/2.

There is a tendency that the PER decreases as the signal-to-noise rate (SNR) increases, and the signal reception performance becomes better as the degree of decrease in the PER becomes greater.

Curve A depicted in the lowest part of FIG. 10 represents the PER with respect to the SNR in the case of no interference, that is, the case of receiving a signal from a single cell. Curve A may be a reference for comparing the performance of the remaining curves.

Curve B and curve C represent the case that the SIR for interference is 0.7 dB, and curve D and curve E represent the case that the SIR for interference is 1.4 dB. Curve B and curve D show the PER change according to the existing technique, that is, the case of receiving a symbol pattern as shown in FIG. 4, and Curve C and curve E show the PER change in the case that the interference diversity proposed in the present invention is applied.

As shown in FIG. 10, it is identified that curve C is inclined with being more closer to curve A in which interference is not existed in comparison with curve B, and curve E is inclined with being more closer to curve A in which interference is not existed in comparison with curve C. When the symbol pattern shown in FIG. 5 is applied, the PER is changed more closely to curve A in comparison with the existing PER, which represents that the reception performance of signal is increased in the case that the symbol pattern shown in FIG. 5 to which the interference diversity of the present invention is applied in comparison with the case that the symbol pattern shown in FIG. 4 is applied.

Figure 11:
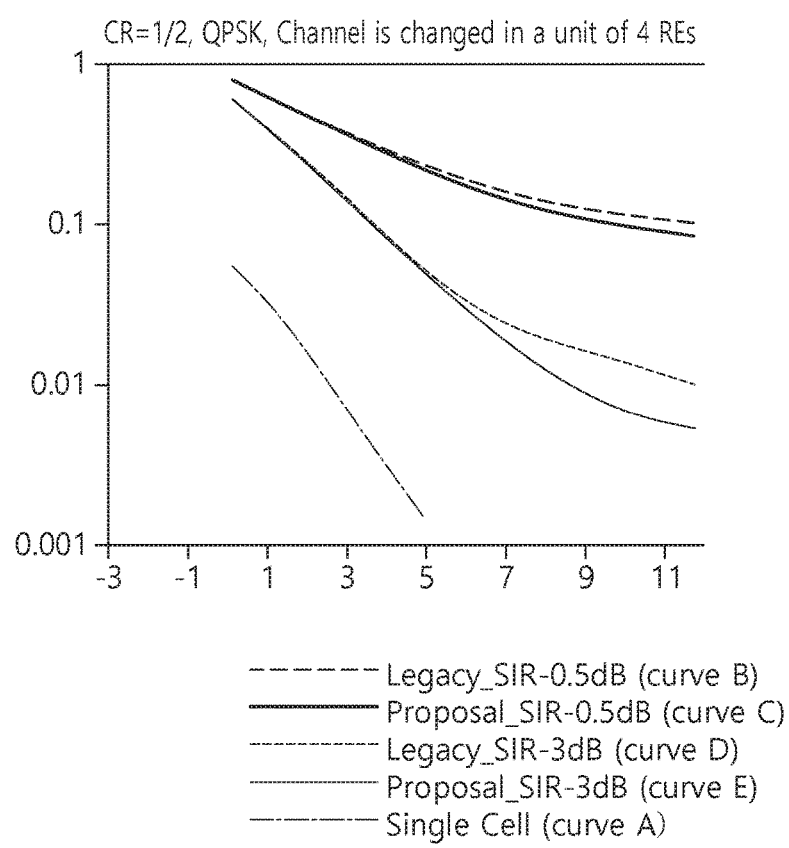
FIG. 11 is a graph illustrating the PER for the SNR in the case that the interference diversity is implemented according to another embodiment of the present invention.

FIG. 11 is a graph illustrating the PER for the SNR in the case that the interference diversity is implemented in a channel situation different from FIG. 10.

Different from FIG. 10, FIG. 11 shows the PER in which the channel change depending on a frequency is improved in a great channel. In this embodiment, a condition is added that the channel changes depending on a frequency in which the channel is changed in a unit of 4 resource elements (REs).

In FIG. 11, a symbol is modulated using a convolution code that uses the QPSK on the assumption of the environment that a moving cell exerts interference on a small cell. FIG. 11 also shows the result that a simulation is performed in the situation that a coding rate is 1/2.

Curve A depicted in the lowest part of FIG. 11 represents the PER with respect to the SNR in the case of no interference, that is, the case of receiving a signal from a single cell. Curve A may be a reference for comparing the performance of the remaining curves.

Curve B and curve C represent the case that the SIR for interference is 0.5 dB, and curve D and curve E represent the case that the SIR for interference is 3 dB. Curve B and curve D show the PER change according to the existing technique, that is, the case of receiving a symbol pattern as shown in FIG. 4, and Curve C and curve E show the PER change in the case that the interference diversity proposed in the present invention is applied.

As shown in FIG. 11, it is identified that curve C is inclined with being more closer to curve A in which interference is not existed in comparison with curve B, and curve E is inclined with being more closer to curve A in which interference is not existed in comparison with curve C. When the symbol pattern shown in FIG. 5 is applied, the PER is changed more closely to curve A in comparison with the existing PER, which represents that the reception performance of signal is increased in the case that the symbol pattern shown in FIG. 5 to which the interference diversity of the present invention is applied in comparison with the case that the symbol pattern shown in FIG. 4 is applied.

Figure 12A:
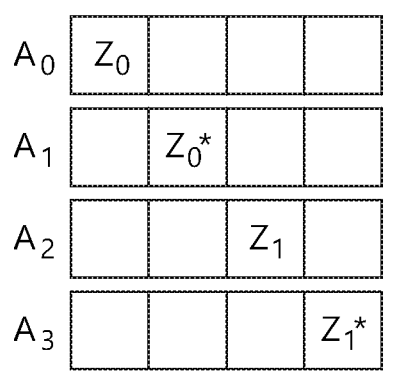

FIGS. 12a to 12c are diagrams illustrating other symbol patterns according to another embodiment of the present invention. Particularly, FIG. 12 is a diagram for describing the precoding performed using different repetition patterns when a symbol is repeated in each base station or cell for three base stations, that is, the inter-cell interference randomization.

According to the symbol pattern shown in FIG. 12a, symbol Z and the modified symbol Z* therefor are sequentially transmitted through an antenna with respect to the same signal. That is, when symbol $Z_0$ is transmitted through antenna 1 ($A_0$), symbol $Z_0^*$ is transmitted through antenna 2 ($A_1$). In addition, when symbol $Z_1$ is transmitted through antenna 3 ($A_2$), symbol $Z_1^*$ is transmitted through antenna 4 ($A_3$), sequentially.

The pattern of such symbols may be represented in a precoding matrix as expressed in Equation 4.

$$\begin{bmatrix} x_{4k} & 0 & 0 & 0 \\ 0 & x_{4k}^* & 0 & 0 \\ 0 & 0 & x_{4k+1} & 0 \\ 0 & 0 & 0 & x_{4k+1}^* \end{bmatrix} \quad \text{[Equation 4]}$$

On the contrary, according to the symbol pattern shown in FIG. 12b, the period of the symbol pattern is 4, and may be cyclic-shifted by an offset being configured to the order of the symbols transmitted.

FIG. 12b shows the case that the number of symbols in which the pattern is repeated is 4, that is, the period is 4, and the offset of the transmission symbol order is 1. This may be represented in a transmission matrix as expressed in Equation 5.

$$\begin{bmatrix} x_{4k} & 0 & 0 & 0 & 0 & 0 & x_{4k+3}^* \\ 0 & x_{4k}^* & 0 & 0 & x_{4k+2} & 0 & 0 \\ 0 & 0 & x_{4k+3} & 0 & 0 & x_{4k+2}^* & 0 \\ 0 & 0 & 0 & x_{4k+1}^* & 0 & 0 & x_{4k+3} \end{bmatrix}$$ [Equation 5]

Symbols $x_{4k}$ and $x_{4k+1}$ may be precoded in the pattern represented in Equation 4. Symbols $x_{4k+2}$ and $x_{4k+3}$, and the modified symbols $x_{4k+2}^*$ and $x_{4k+3}^*$ may be allocated to the antenna resource with being moved as much as offset 1.

In addition, FIG. 12c shows the case that the number of symbols in which the pattern is repeated is 4, that is, the period is 4, and the offset of the transmission symbol order is 3.

This may be represented in a precoding matrix as expressed in Equation 6.

$$\begin{bmatrix} x_{4k} & 0 & 0 & 0 & x_{4k+2}^* & 0 & 0 \\ 0 & x_{4k}^* & 0 & 0 & 0 & x_{4k+3} & 0 \\ 0 & 0 & x_{4k+1} & 0 & 0 & 0 & x_{4k+3}^* \\ 0 & 0 & 0 & x_{4k+1}^* & x_{4k+2} & 0 & 0 \end{bmatrix}$$ [Equation 6]

According to Equation 6, symbols $x_{4k}$ and $x_{4k+1}$ may be precoded in the pattern represented in Equation 4. Symbols $x_{4k+2}$ and $x_{4k+3}$, and the modified symbols $x_{4k+2}^*$ and $x_{4k+3}^*$ may be allocated to the antenna resource with being moved as much as offset 3.

FIG. 12 shows the example of the case that the same period and different offsets are applied for each cell, and a plurality of inter-cell interference randomizations are performed. However, different periods may be applied for each cell and a plurality of inter-cell interference randomizations may also be performed.

In addition, according to the period of the cyclic shift, the cell that uses the same transmission antenna port may use the precoder of different sizes.

For example, in Equation 5 or Equation 6, the period of the cyclic shift in which a symbol is repeated is 4, but may be 5 or more. Further, when a period is set, the offset value may be set as the maximum "period −1" value.

In addition, in the case that the repetition pattern of symbols $x_{4k}$ and $x_{4k+1}$ may also be changed, the symbols may be allocated to the antenna resource according to a predetermined offset.

Between the cells that may be an interference source with each other, when the precoding for a signal is performed, the pattern of the repeated symbol may be variously changed by pre-configuring the precoder such as Equations 4 to 6. Through this, the interference diversity may be secured, thereby the reception capability of a signal being improved, and the situation in which the performance of the reception signal is degraded due to strong interference may be prevented.

Figure 13:
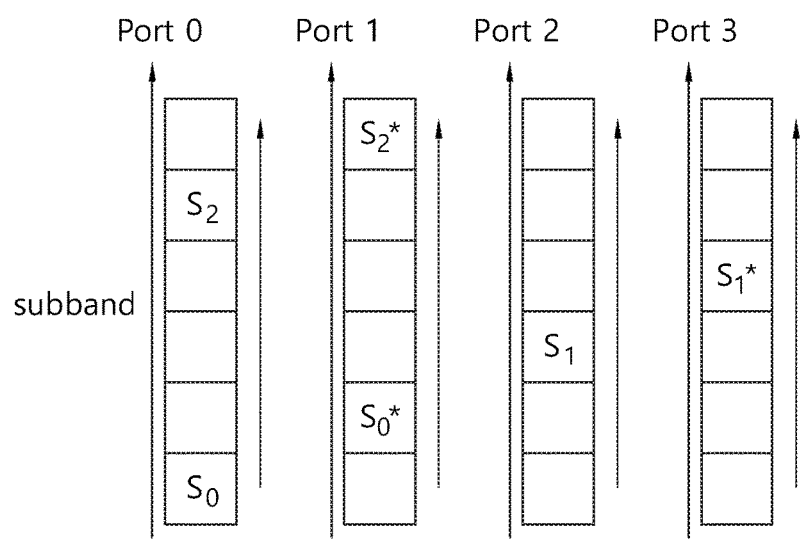
FIG. 13 is a diagram illustrating the resource allocation of the first cell according to FIG. 5.

FIG. 13 is a diagram illustrating the resource allocation of the first cell according to FIG. 5.

According to FIG. 13, after precoding using Equation 4, the first cell may map the symbol with respect to a frequency axis (subband).

Symbols $S_0$ and $S_2$ allocated to the frequency resource may be transmitted through antenna port 0, and the modified symbols ($S_0^*$ and $S_2^*$) of the symbols transmitted through antenna port 0 may be transmitted to a wireless device through antenna port 1. Similarly, symbol $S_1$ allocated to the frequency resource may be transmitted through antenna port 2, and the modified symbol ($S_1^*$) of the symbol transmitted through antenna port 2 may be transmitted to a wireless device through antenna port 3.

Figure 14:
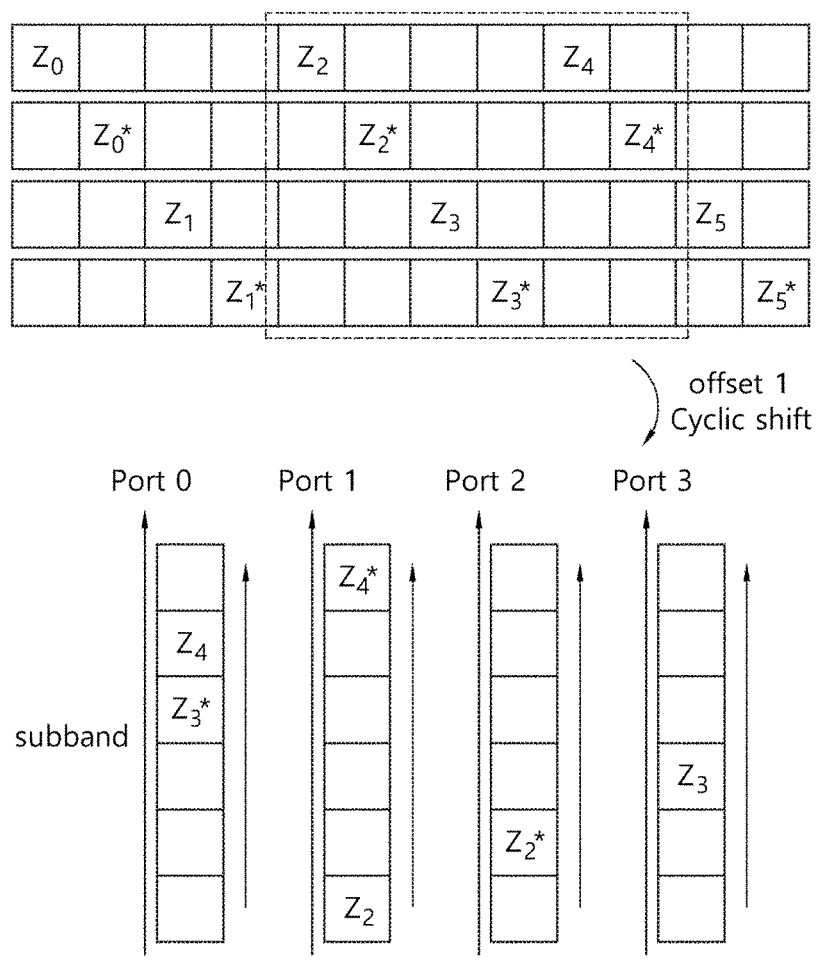
FIG. 14 is a diagram illustrating the symbol pattern of the second cell and the resource allocation according to an example of the present invention.

FIG. 14 is a diagram illustrating the symbol pattern of the second cell and the resource allocation according to an example of the present invention.

According to an embodiment of the present invention, the second cell may set a repetition pattern of a symbol as shown in the upper part of FIG. 14, and may precode using Equation 5. After precoding, the second cell may change the pattern of the symbol by applying different hopping, which is, scrambling for each antenna, and may map the changed symbol pattern to the frequency resource as shown in the lower part of FIG. 14.

As shown in the lower part of FIG. 14, symbols $Z_2$, $Z_3$ and $Z_4$, and the modified symbols $Z_2^*$, $Z_3^*$ and $Z_4^*$ therefor may be allocated to the antenna resource by being cyclic-shifted as much as offset 1.

Figure 15:
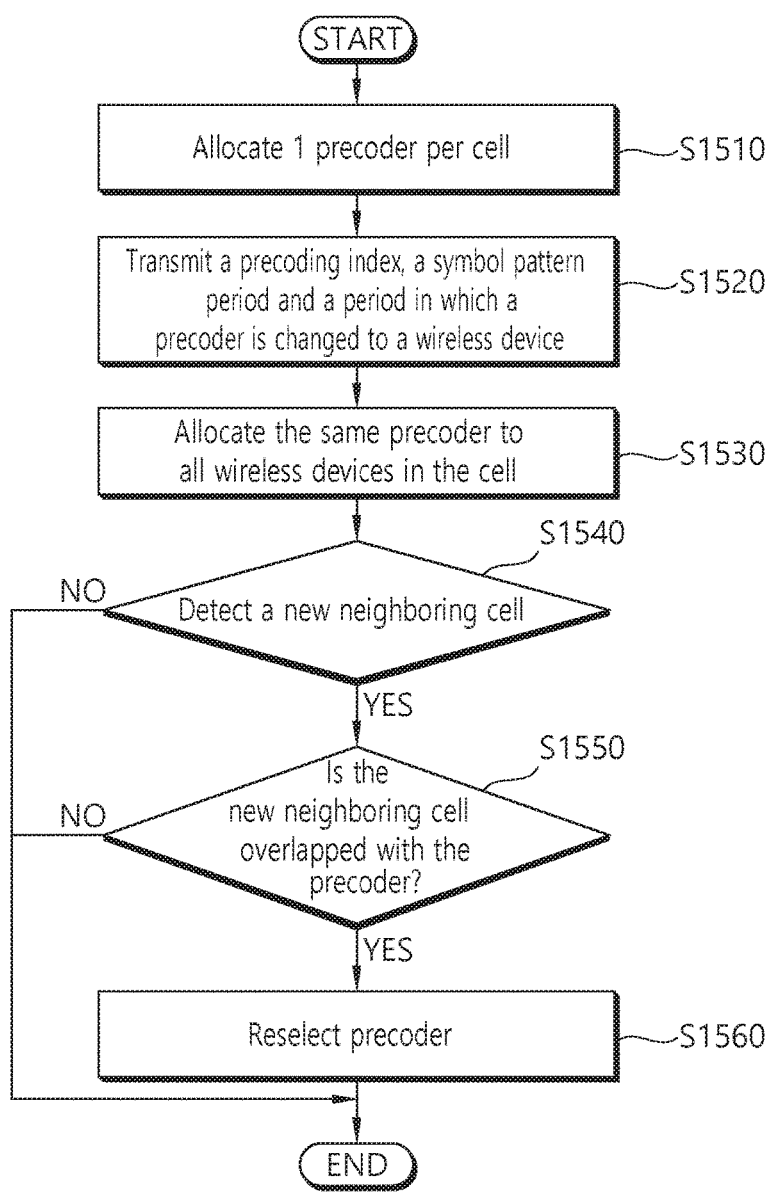
FIG. 15 is a control flowchart for describing a precoder allocation method according to an embodiment of the present invention.

FIG. 15 is a control flowchart for describing a precoder allocation method according to an embodiment of the present invention.

First, according to the embodiment, a precoder per cell may be allocated (step S1510).

When a precoder per cell is allocated, a base station transmits a precoding index, a symbol pattern period, a period in which a precoder is changed, and the like to a wireless device as the system information (SI) (step S1520).

The base station may allocate the same precoder to all wireless devices in the cell managed by the base station (step S1530).

When a new neighboring cell is detected (step S1540), the base station may determine whether the detected new neighboring cell is overlapped with the precoder (step S1550).

As a result of the determination, in the case that the precoder of the new neighboring cell is overlapped with the precoder applied to the cell managed by the base station itself, the base station may reselect a precoder based on a specific order or a pattern (step S1560). The base station may select a precoder by taking an offset, random variable K, to a cell ID, that is, according to the cell ID+K.

According to the embodiment, the number of precoders that the base station uses may be selected according to the cell ID, and the precoder may be randomly changed according to a predetermined period in the base station.

In the case that a precoder is selected according to the cell ID, the number of precoders may be smaller than the number of cell IDs. Meanwhile, as the period of the symbol pattern applied to the precoder is greater, it may be efficient for the signal transmission that the base station randomly changes the precoder.

Figure 16:
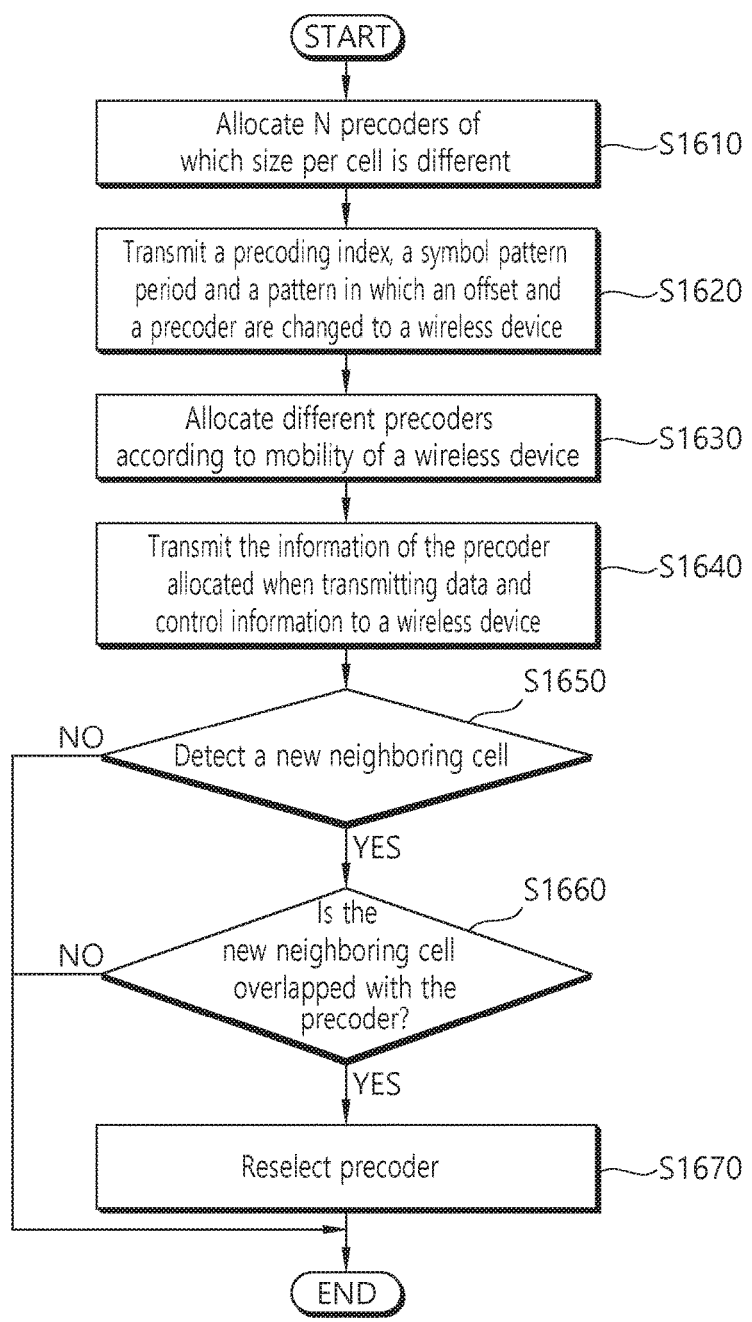
FIG. 16 is a control flowchart for describing a precoder allocation method according to another embodiment of the present invention.

FIG. 16 is a control flowchart for describing a precoder allocation method according to another embodiment of the present invention.

According to the embodiment, the precoder for each cell may be periodically changed.

Each base station may allocate N (N is an integer of 1 or greater) precoders of which size per cell is different (step S1610). When N precoders are allocated, the base station transmits a precoding index, a symbol pattern period, a pattern in which an offset and a precoder are changed, and the like to a wireless device as the system information (SI) (step S1620).

The base station may allocate different precoders according to mobility of a wireless device in the cell managed (step S1630).

In this case, when transmitting data or control information, the base station may transmit the information of the allocated precoder to a wireless device (step S1640).

When a new neighboring cell is detected (step S1650), the base station may determine whether the detected new neighboring cell is overlapped with the precoder (step S1660).

As a result of the determination, in the case that the precoder of the new neighboring cell is overlapped with the precoder applied to the cell managed by the base station itself, the base station may reselect a precoder based on a specific order or a pattern (step S1670). The base station may select a precoder by taking an offset, random variable K, to a cell ID, that is, according to the cell ID+K.

According to the embodiment, the number of precoders that the base station uses may be selected according the cell ID, and the precoder may be randomly changed according to a predetermined period in the base station.

In the case that a precoder is selected according to the cell ID, the number of precoders may be smaller than the number of cell IDs. Meanwhile, as the period of the symbol pattern applied to the precoder is greater, it may be efficient for the signal transmission that the base station randomly changes the precoder.

Meanwhile, the base station may dynamically allocate the transmission diversity precoder. That is, as shown in FIG. 15 or FIG. 16, a wireless device may directly forward the precoding index without following a specific rule. In this case, the base station may transmit the precoding index through a designated pilot signal.

Figure 17:
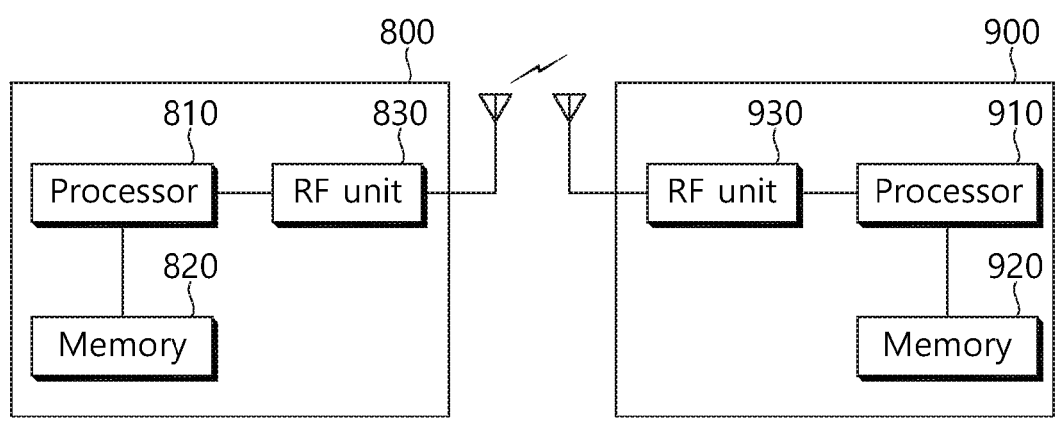
FIG. 17 is a block diagram illustrating a wireless communication system according to the present invention.

FIG. 17 is a block diagram illustrating a wireless communication system according to the present invention.

The base station 800 includes a processor 810, a memory 820, and an RF (radio frequency) unit 830. The processor 810 implements functions, processes, and/or methods as suggested herein. The layers of a wireless interface protocol may be implemented by the processor 810. The memory 820 is connected with the processor 810 and stores various pieces of information for driving the processor 810. The RF unit 830 is connected with the processor 810 and transmits and/or receives radio signals.

The wireless device 900 includes a processor 910, a memory 920, and an RF unit 930. The processor 910 implements functions, processes, and/or methods as suggested herein. The layers of a wireless interface protocol may be implemented by the processor 910. The memory 920 is connected with the processor 910 and stores various pieces of information for driving the processor 910. The RF unit 930 is connected with the processor 910 and transmits and/or receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

As such, when a wireless access is available through different wireless networks, the present invention provides a method and apparatus for a wireless device to select a wireless node for uplink according to a predetermined condition.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method for mitigating inter-cell interference, the method performed by a cellular network system including a first cell and a second cell and comprising:

precoding, by a transmitter of the first cell, symbols $S_{2k}$, $S_{2k}^*$, $S_{2k+1}$, and $S_{2k+1}^*$ according to a first pattern;

precoding, by a transmitter of the second cell, symbols $Z_{4k}$, $Z_{4k}^*$, $Z_{4k+1}$, $Z_{4k+1}^*$, $Z_{4k+2}$, $Z_{4k+2}^*$, $Z_{4k+3}$, and $Z_{4k+3}^*$ according to a second pattern;

transmitting, by the transmitter of the first cell, a first signal including the precoded symbols $S_{2k}$, $S_{2k}^*$, $S_{2k+1}$, and $S_{2k+1}^*$ to a receiver; and transmitting, by the transmitter of the second cell, a second signal including the precoded symbols $Z_{4k}$, $Z_{4k}^*$, $Z_{4k+1}$, $Z_{4k+1}^*$, $Z_{4k+2}$, $Z_{4k+2}^*$, $Z_{4k+3}$, and $Z_{4k+3}^*$ to the receiver, wherein the first pattern is configured to a first sequence $\{S_{2k}, 0, 0, 0\}$ for a first antenna, a second sequence $\{0, S_{2k}^*, 0, 0\}$ for a second antenna, a third sequence $\{0, 0, S_{2k+1}, 0\}$ for a third antenna, and a fourth sequence $\{0, 0, 0, S_{2k+1}^*\}$ for a fourth antenna, wherein the second pattern is configured to a fifth sequence $\{Z_{4k}, 0, 0, 0, 0, 0, 0, Z_{4k+3}^*\}$ for a fifth antenna, a sixth sequence $\{0, Z_{4k}^*, 0, 0, Z_{4k+2}, 0, 0, 0\}$ for a sixth antenna, a seventh sequence $\{0, 0, Z_{4k+1}, 0, 0, Z_{4k+2}^*, 0, 0\}$ for a seventh antenna, and an eighth sequence $\{0, 0, 0, Z_{4k+1}^*, 0, 0, Z_{4k+3}, 0\}$ for an eighth antenna, wherein the symbols $S_{2k}^*$, $S_{2k+1}^*$, $Z_{4k}^*$, $Z_{4k+1}^*$, $Z_{4k+2}^*$, $Z_{4k+3}^*$ are obtained by performing a complex conjugate operation on the corresponding symbols $S_{2k}$, $S_{2k+1}$, $Z_{4k}$, $Z_{4k+1}$, $Z_{4k+2}$, $Z_{4k+3}$, and wherein k is an integer.

2. The method of claim 1, wherein the first pattern and the second pattern are changed according to a predetermined period.

3. A cellular network system including a first cell and a second cell for mitigating inter-cell interference, the cellular network system comprising:

a transmitter of the first cell configured to precode symbols $S_{2k}$, $S_{2k}^*$, $S_{2k+1}$, and $S_{2k+1}^*$ according to a first pattern; and a transmitter of the second cell configured to precode symbols $Z_{4k}$, $Z_{4k}^*$, $Z_{4k+1}$, $Z_{4k+1}^*$, $Z_{4k+2}$, $Z_{4k+2}^*$, $Z_{4k+3}$, and $Z_{4k+3}^*$ according to a second pattern, wherein the transmitter of the first cell is further configured to transmit a first signal including the precoded symbols $S_{2k}$, $S_{2k}^*$, $S_{2k+1}$, and $S_{2k+1}^*$ to a receiver, wherein the transmitter of the second cell is further configured to transmit a second signal including the precoded symbols $Z_{4k}$, $Z_{4k}^*$, $Z_{4k+1}$, $Z_{4k+1}^*$, $Z_{4k+2}$, $Z_{4k+2}^*$, $Z_{4k+3}$, and $Z_{4k+3}^*$ to the receiver, wherein the first pattern is configured to a first sequence $\{S_{2k}, 0, 0, 0\}$ for a first antenna, a second sequence $\{0, S_{2k}^*, 0, 0\}$ for a second antenna, a third sequence $\{0, 0, $S_{2k+1}$, 0} for a third antenna, and a fourth sequence {0, 0, 0, $S_{2k+1}^*$} for a fourth antenna, wherein the second pattern is configured to a fifth sequence {$Z_{4k}$, 0, 0, 0, 0, 0, 0, $Z_{4k+3}^*$} for a fifth antenna, a sixth sequence {0, $Z_{4k}^*$, 0, 0, $Z_{4k+2}$, 0, 0, 0} for a sixth antenna, a seventh sequence {0, 0, $Z_{4k+1}$, 0, 0, $Z_{4k+2}^*$, 0, 0} for a seventh antenna, and an eighth sequence {0, 0, 0, $Z_{4k+1}^*$, 0, 0, $Z_{4k+3}$, 0} for an eighth antenna, wherein the symbols $S_{2k}^*$, $S_{2k+1}^*$, $Z_{4k}^*$, $Z_{4k+1}^*$, $Z_{4k+2}^*$, $Z_{4k+3}^*$ are obtained by performing a complex conjugate operation on the corresponding symbols $S_{2k}$, $S_{2k+1}$, $Z_{4k}$, $Z_{4k+1}$, $Z_{4k+2}$, $Z_{4k+3}$, and wherein k is an integer.

4. The cellular network system of claim 3, wherein the first pattern and the second pattern are changed according to a predetermined period.

* * * * *